US007738502B2

United States Patent
Chang et al.

(10) Patent No.: US 7,738,502 B2
(45) Date of Patent: Jun. 15, 2010

(54) SIGNAL NOISE FILTERING IN A SERIAL INTERFACE

(75) Inventors: Naichih Chang, Shrewsbury, MA (US); Pak-Lung Seto, Shrewsbury, MA (US); Luke L. Chang, Marlboro, MA (US)

(73) Assignee: Intel Corporation, Santa Clara, CA (US)

( * ) Notice: Subject to any disclaimer, the term of this patent is extended or adjusted under 35 U.S.C. 154(b) by 515 days.

(21) Appl. No.: 11/514,579

(22) Filed: Sep. 1, 2006

(65) Prior Publication Data

US 2008/0056424 A1   Mar. 6, 2008

(51) Int. Cl.
H04L 7/00 (2006.01)
(52) U.S. Cl. ............... 370/503; 370/216; 370/252; 375/371; 375/350
(58) Field of Classification Search ............. 370/503
See application file for complete search history.

(56) References Cited

U.S. PATENT DOCUMENTS

| 6,662,322 | B1 | 12/2003 | Abdelilah et al. |
| 6,871,295 | B2 | 3/2005 | Ulrich et al. |
| 6,996,738 | B2 | 2/2006 | Chiang |
| 7,436,617 | B2 * | 10/2008 | Chang ............. 360/75 |
| 2004/0234015 | A1 * | 11/2004 | Janapaty et al. ....... 375/350 |
| 2007/0223517 | A1 * | 9/2007 | Warren et al. ......... 370/463 |

FOREIGN PATENT DOCUMENTS

WO   WO 2003/065633 A2   8/2003

OTHER PUBLICATIONS

International Preliminary Report on Patentability for Patent Application No. PCT/US2007/076430, mailed Mar. 12, 2009, 6 Pages.
"Serial Attached SCSI—1.1 (SAS-1.1)", *American National Standard*, pp. 112-124; and 248-263, (2005).
"Serial ATA Revision 2.5", *Serial ATA*, pp. 163-213, (2005).
International Search Report and Written Opinion of International Patent Application Serial No. PCT/US07/076430 filed Aug. 21, 2007, Mailed Feb. 11, 2008, 10 pgs.

\* cited by examiner

*Primary Examiner*—Ayaz R Sheikh
*Assistant Examiner*—Nicholas Sloms
(74) *Attorney, Agent, or Firm*—Caroline M. Fleming

(57) ABSTRACT

A noise filtering system provides adaptive noise filtering in the physical layer of serial and parallel interfaces for storage protocol applications. The system provides adaptive noise filtering for both hot plug and hot removal applications.

17 Claims, 10 Drawing Sheets

SIGNAL NOISE FILTERING IN A SERIAL INTERFACE

FIELD

This disclosure relates to serial protocols and in particular to filtering unexpected noise received on a serial interface.

BACKGROUND

Serial Advanced Technology Attachment (SATA) devices are commonly used in mobile computers due to their small footprint. However, SATA devices are sensitive to noise that may occur due to mechanical vibrations and via SATA connector movement. For example, when a mobile computer is placed on top of a desk, a mechanical vibration may result in glitches/noises on the SATA interface which may result in falsely detecting signal loss of synchronization. Glitches or noise may be generated due to hot-plug and hot-removal of SATA devices which may result in a false detection of loss of synchronization.

The SATA architecture includes a phy layer that performs a phy reset sequence after power on or reset to initialize a SATA link to be operational. After the SATA link is operational, the phy layer also performs the phy reset sequence upon detecting a loss of synchronization which may be due to detecting noise on the SATA link. The operations performed by the phy reset sequence may result in unsaved data being lost.

In order to protect against false detection of loss of synchronization, a SATA host typically delays initiating the phy reset sequence for a fixed time period. Typically the fixed time period is selected to ensure that intermittent noise on the SATA interface does not result in the initiation of a phy reset sequence. If the fixed time period is too short, the SATA host may initiate a phy reset sequence for each intermittent noise period. However, if the fixed time period is too long, the SATA host waits longer than necessary after detecting noise on the SATA interface before resuming normal operation.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
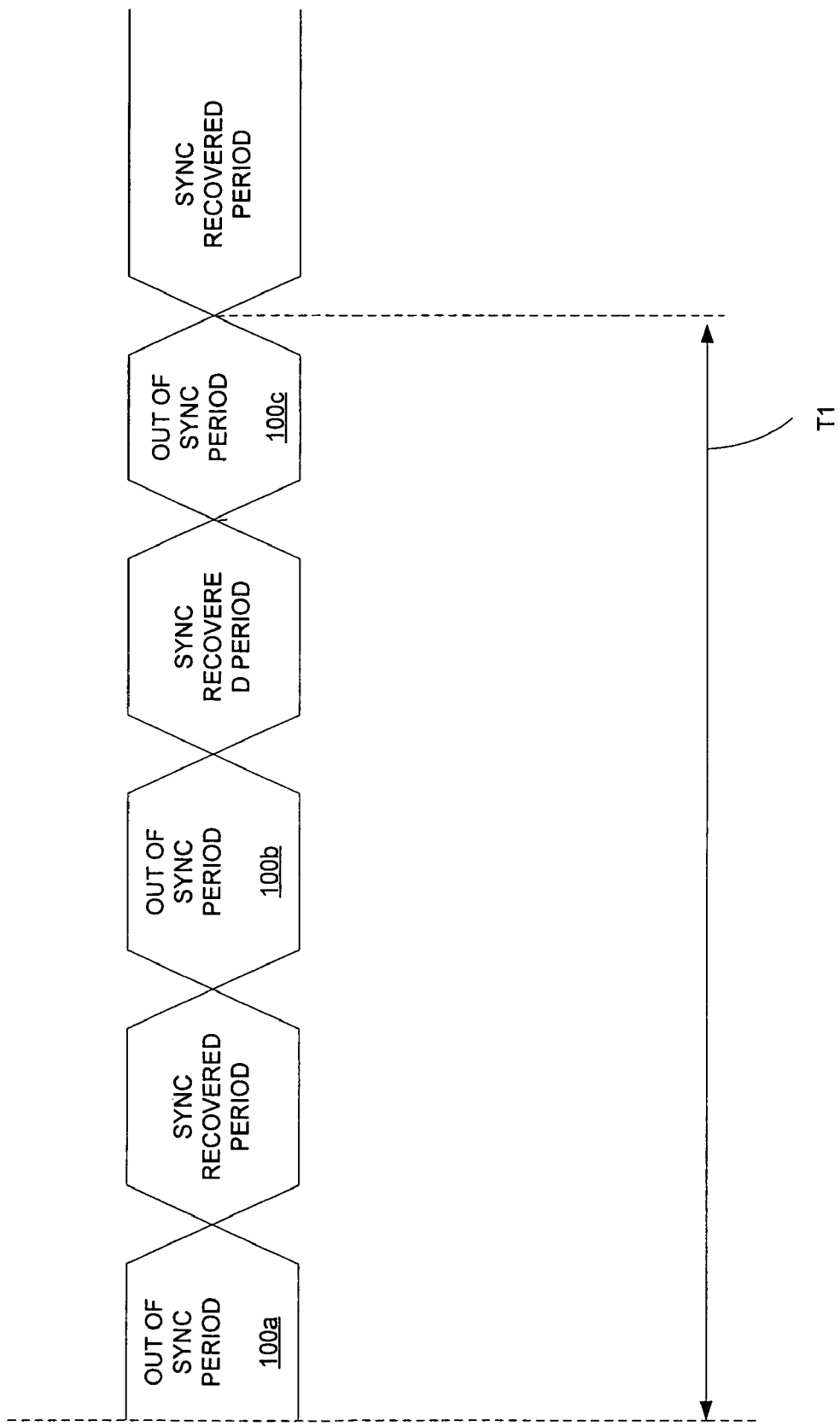
FIG. 1 illustrates a pattern of out of synchronization periods and synchronization recovered periods due to noise or loss of synchronization on a link between a host and a device.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

There are many serial storage protocol suites such as, Serial Attached Small Computer System Interface (SAS) and Serial Advanced Technology Attachment (SATA). A version of the SATA protocol is described in "Serial ATA: High Speed Serialized AT Attachment," Revision 1.0a, published on Jan. 7, 2003 by the Serial ATA Working Group (hereinafter termed the "SATA standard"). A version of the SAS protocol is described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (ANSI) (hereinafter termed the "SAS Standard").

An embodiment of the invention will be described for the SATA protocol. Storage protocols such as the SATA protocol support active communication between a storage device and host bus adaptor (controller or host adaptor) 230. When a connection is established between a host bus adapter and the storage device in a connection oriented environment, the host bus adapter is given exclusive access to the storage device until all of the pending commands in the storage device are complete.

The SATA protocol architecture defines four layers: phy, link, transport and application. Phy layer, functions include link level reset, initialization and speed negotiation which are performed using a phy reset sequence (Out of Band (OOB) sequence) and a speed negotiation sequence. The speed negotiation sequence begins after the OOB sequence is complete.

A phy reset sequence is originated by the SATA phy layer upon power on, a hard reset or upon a request from an application layer. The phy layer may perform a phy reset sequence to reset a link between the host adapter and the storage device (storage peripheral) upon detecting a loss of synchronization on the link. The loss of synchronization on the link may be due to detecting noise or glitches on the link.

The link layer defines an encoding scheme in which information (data and control) is encoded into 10-bit characters using 8b/10b encoding. In 8b/10b encoding, eight bits are encoded at a time into a 10-bit character and then transmitted serially bit-by-bit across the physical link. Eight information bits and a control variable (value D-data, value K-control) is encoded into the 10-bit character.

The 8-bit characters are grouped into four 8-bit character sequences that are referred to as dwords. A primitive is a dword whose first character is a control character. For example, the ALIGN primitive used by the phy layer is a dword whose first 8-bit character is the K28.5 control character.

The transport layer constructs Frame Information Structures (FISes) for transmission and decomposes received FISes. A FIS is the user payload of a frame. In addition to the FIS, a frame includes primitives (Start of Frame ($SOF_P$), End of Frame ($EOF_P$)) and a Cyclic Redundancy Check (CRC)).

The OOB sequence includes a plurality of OOB signals which are signal patterns that do not appear in normal data streams. An OOB signal includes idle time followed by burst time. During the idle time, the physical link carries D.C. idle and during the burst time, the physical link carries signal transitions.

To transmit an OOB signal, a transmitter device sends the following sequence six times; (1) transmit D.C. idle for an idle time and (2) transmit an OOB burst of ALIGN primitives for a burst time. D.C. idle is a differential signal level that is about 0 Volts (peak-to-peak) used during the idle time of an OOB signal. An OOB signal is defined based on the length of the D.C. idle time between the OOB bursts of ALIGN primitives. SATA defines the COMINIT, COMRESET and COM-WAKE OOB signals.

Upon detecting loss of synchronization (LOS), a SATA host or SATA device may initiate out-of-band (OOB) sequencing. A phy layer in a SATA host initiates OOB sequencing by issuing a COMRESET OOB signal. A SATA device coupled to a SATA host initiates OOB sequencing by issuing a COMINIT OOB signal. The COMRESET OOB signal issued by the SATA host results in resetting all internal state.

In the OOB sequence for a SATA host/device, a SATA device responds with a COMINIT OOB signal in response to a COMRESET OOB signal received from a SATA host. The SATA host and SATA device then exchange COMWAKE OOB signals. The COMRESET OOB signal originates from the SATA host and forces a hard reset in the SATA device. After the SATA host releases the COMRESET OOB signal the SATA device issues COMINIT which results in the SATA host reinitializing communications with the SATA device. The SATA device may also originate a COMINIT OOB signal to request a hard reset from the SATA host.

FIG. 1 illustrates a pattern of out of synchronization (sync) periods and synchronization recovered periods due to noise or loss of synchronization on a SATA link between a SATA host and a SATA device. The SATA device may be a disk drive, flash card, compact disk (CD) drive, digital video disk (DVD) drive or tape drive. The link between the SATA host and the SATA device is stable during the synchronization recovered periods with control and data capable of being exchanged between the SATA host and the SATA device.

Typically, upon detection of an out of synchronization period, an interrupt may be issued to notify a processor to handle the loss of synchronization condition. Each interrupt consumes processor processing cycles and may reduce the processing cycles available to handle task processing for another SATA device on another link/lane.

To minimize initiating a phy reset sequence during a temporary unstable period due to noise/glitches, each host device defines a device specific timeout timer for tracking 'loss of synchronization' period—for simplicity, it is defined as a Loss of Synchronization (LOS) timer. The LOS timer is set to a default fixed time period (LOS time period) T1 upon detecting a first out of sync period. Out of sync periods due to noise or temporary loss of synchronization typically occur during T1. Thus, all communications on the link are disabled during T1. By automatically filtering out false alarms due to noise, the number of interrupts is reduced providing more processing cycles to handle task processing for other lanes.

Referring to FIG. 1, out of synchronization periods 100a, 100b and 100c are ignored during T1. However, the fixed LOS time period is typically much longer than necessary which results in reduced throughput on a SATA link between a SATA host and a SATA device. For example, communications on the SATA link are disabled for T1 even if there is only one out of sync period 100a during T1.

Figure 2:
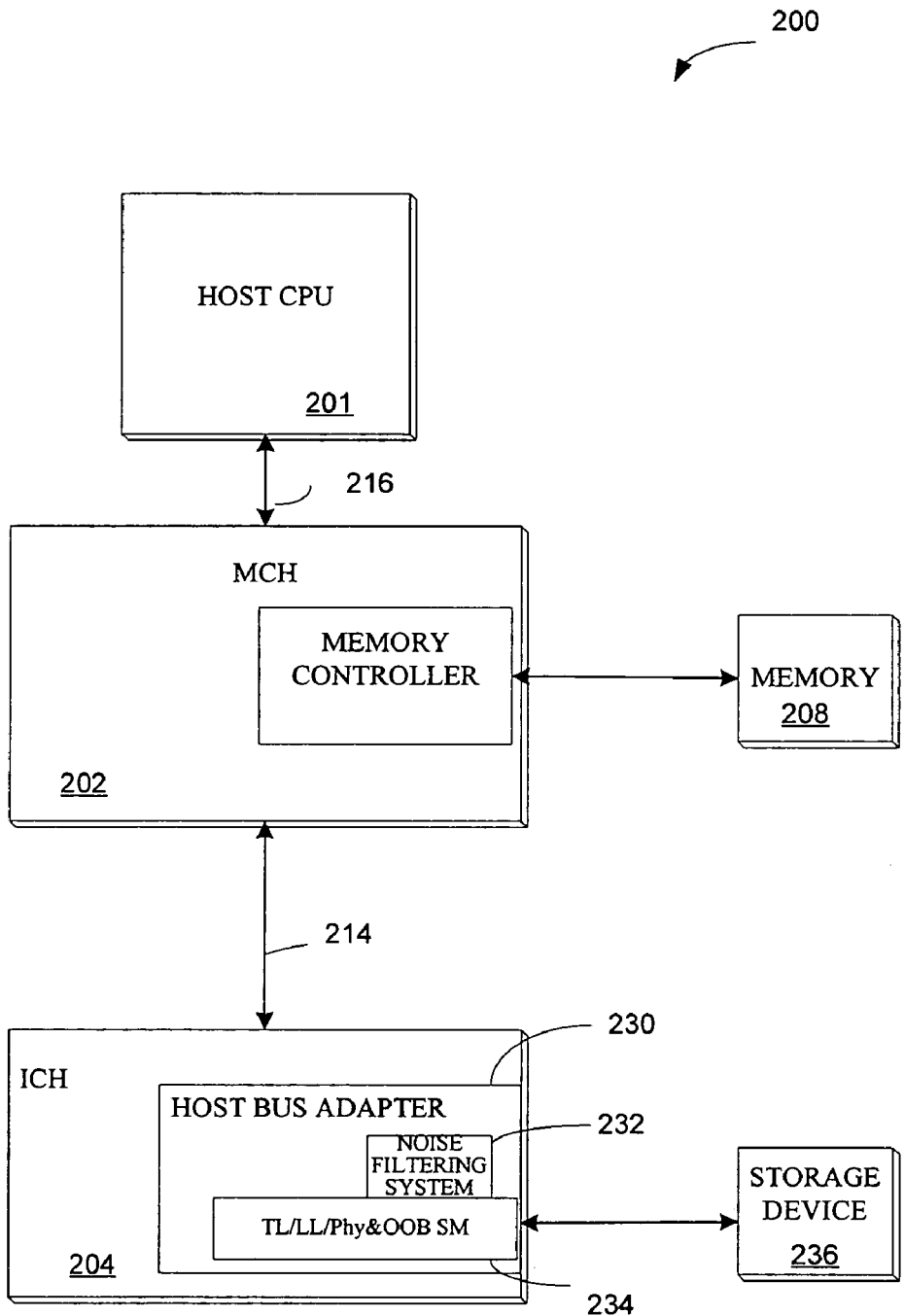
FIG. 2 is a block diagram of a system that includes an embodiment of a noise filtering system according to the principles of the present invention.

FIG. 2 is a block diagram of a system 200 that includes an embodiment of a noise filtering system 232 according to the principles of the present invention. The system 200 includes a Central Processing Unit (CPU) 201, a Memory Controller Hub (MCH) 202 and an I/O Controller Hub (ICH) 204. The MCH 202 controls communication between the CPU 201 and memory 208.

The Central Processing Unit (CPU) 201 may be any one of a plurality of processors such as a single core Intel® Pentium IV® processor, a single core Intel Celeron processor, an ®XScale processor or a multi-core processor such as Intel® Pentium D, Intel® Xeon® processor, or Intel® Core® Duo processor or other processor.

The memory 208 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 204 may be coupled to the MCH 202 using a high speed chip-to-chip interconnect 214 such as Direct Media Interface (DMI). DMI supports 2 Gigabit/second concurrent transfer rates via two unidirectional lanes. The CPU 201 and MCH 202 communicate over a system bus 216.

The ICH 204 includes a SATA host adaptor (controller or host bus adaptor) 230 for controlling communication with a storage device 236 coupled to the ICH 204. The host adaptor 230 includes an embodiment of a noise filtering system 232 that operates in conjunction with SATA protocol layers (transport layer (TL), link layer (LL) and phy and OOB State machine) 234 to provide a dynamic delay period prior to determining whether to initiate a phy reset sequence upon detecting a loss of synchronization in a SATA environment.

Figure 3:
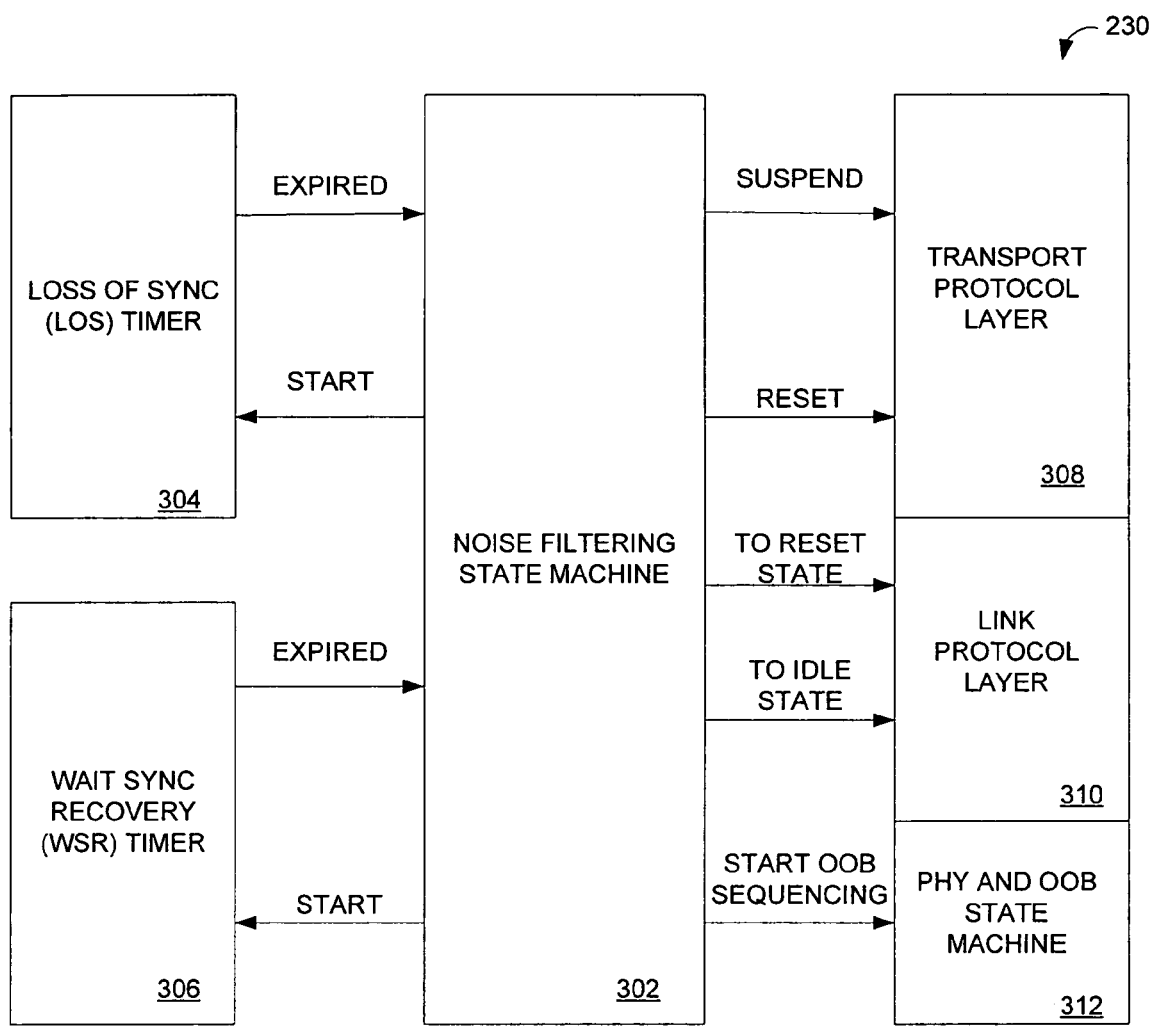
FIG. 3 is a block diagram of an embodiment of the host adapter shown in FIG. 2 that includes an embodiment of a noise filtering system according to the principles of the present invention.

FIG. 3 is a block diagram of an embodiment of the host adapter 230 shown in FIG. 2 that includes an embodiment of a noise filtering system according to the principles of the present invention.

The noise filtering system includes a noise filtering state machine 302 coupled to a Wait Synchronization Recovery (WSR) Timer 306 and a Loss of Synchronization (LOS) Timer 304. The noise filtering system 302 operates in conjunction with SATA protocol layers (transport layer 308, link--layer 310 and phy and OOB State machine 312) to provide a dynamic delay period prior to determining whether to initiate a phy reset sequence upon detecting a loss of synchronization in a SATA environment.

The noise filtering system 230 significantly reduces the lengthy noise recovery time. Upon detecting loss of synchronization, unexpected noises/glitches are filtered out and initiation of the phy layer reset sequence is avoided. The dynamic delay period is provided to determine whether to initiate a device reset or resume normal operation upon loss of synchronization in a storage environment. In the case of loss of synchronization due to noise, the dynamic delay period allows resumption of normal operation much earlier than the use of the fixed LOS delay time period.

The dynamic delay period is provided through a dynamic 'loss of sync' sampling system that provides an adaptive way to perform noise filtering in serial storage protocol applications. This allows the recovery period of a system in a less noise interrupted environment, due to the 'loss of sync' sampling, to resume normal operation much quicker than a system in a higher noise interrupted environment instead of using a default fixed LOS delay for all environments.

In the embodiment shown, the LOS timer expiration time is selected to be relatively close to the time typically defined in most host devices and substantially longer than the Wait Sync Recovery (WSR) timer expiration time. The WSR timer 304 (with time in the nanosecond range) in conjunction with the noise filtering state machine significantly reduces the time to resume normal operation provided by the default LOS timer 306 (in millisecond range).

The noise filtering state machine 302 monitors noises/glitches and loss of synchronization from the storage device 232 (FIG. 2). For example, in the SATA interface, loss of synchronization can be determined by the state of a PHYRDY signal in the phy layer. The state of the PHYRDY signal indicates whether the phy is maintaining synchronization with the incoming signal to its receiver and is transmitting a valid signal on its transmitter. In a SAS interface, a DWORD Synchronization State Machine (DWS) lost message indicates that synchronization has been lost. The DWS lost message and the PHYRDY signal can be used to indicate loss of synchronization from the storage device.

Upon detecting noise/glitches or loss of synchronization, the noise filtering state machine 302 enables the LOS timer 304, sends a suspend request to the transport protocol layer 308 and a request to the link protocol layer 310 to transition to idle or default state of all defined state machines. On a loss of synchronization, the noise filtering state machine 302 may also send an internal signal to the phy and OOB state machine. For example, in one embodiment the internal signal may be the HRESET signal defined in the SATA specification and in another embodiment the internal signal may be a user defined signal.

While the transport protocol layer 308 is suspended and the link protocol layer 310 is in the idle state 400 refer to state diagram which will be discussed in conjunction with FIG. 4, the phy and OOB state machine 312 waits for a request from the noise filtering state machine 302 to start the OOB sequence. The OOB sequence results in issuing a COMRESET signal to the device to perform a device hard reset.

The noise filtering state machine 302 also starts the WSR timer 306 and monitors that the WSR timer 306 has expired N times. If there is no loss of synchronization after the WSR timer 306 has expired N times, normal operation is resumed by de-asserting the signals to the transport protocol layer 308, the link protocol layer 310 and the phy and OOB state machine 312 which suspended operation of these protocol layers. If there is loss of synchronization after the WSR timer 306 has expired N times or the LOS Timer 304 expires prior to the WSR timer 306 having expired N times, the noise filtering state machine 302 sends a start OOB sequencing request to the phy and OOB state machine 312, a request to transition to reset state 406 to the link protocol layer 310 and a request to reset to the transport protocol layer 308.

Thus, the noise filtering state machine 302 prevents the host bus adaptor 230 (FIG. 2) from starting OOB sequencing and issuing the COMRESET signal (which is a hard reset to the device) due to unexpected noises or external interferences. Furthermore, the expiration time of the WSR timer 306 is much shorter than the expiration time of the LOS timer 304 allowing all protocol layers to resume normal operations much faster than waiting for the LOS timer expiration time.

Figure 4:
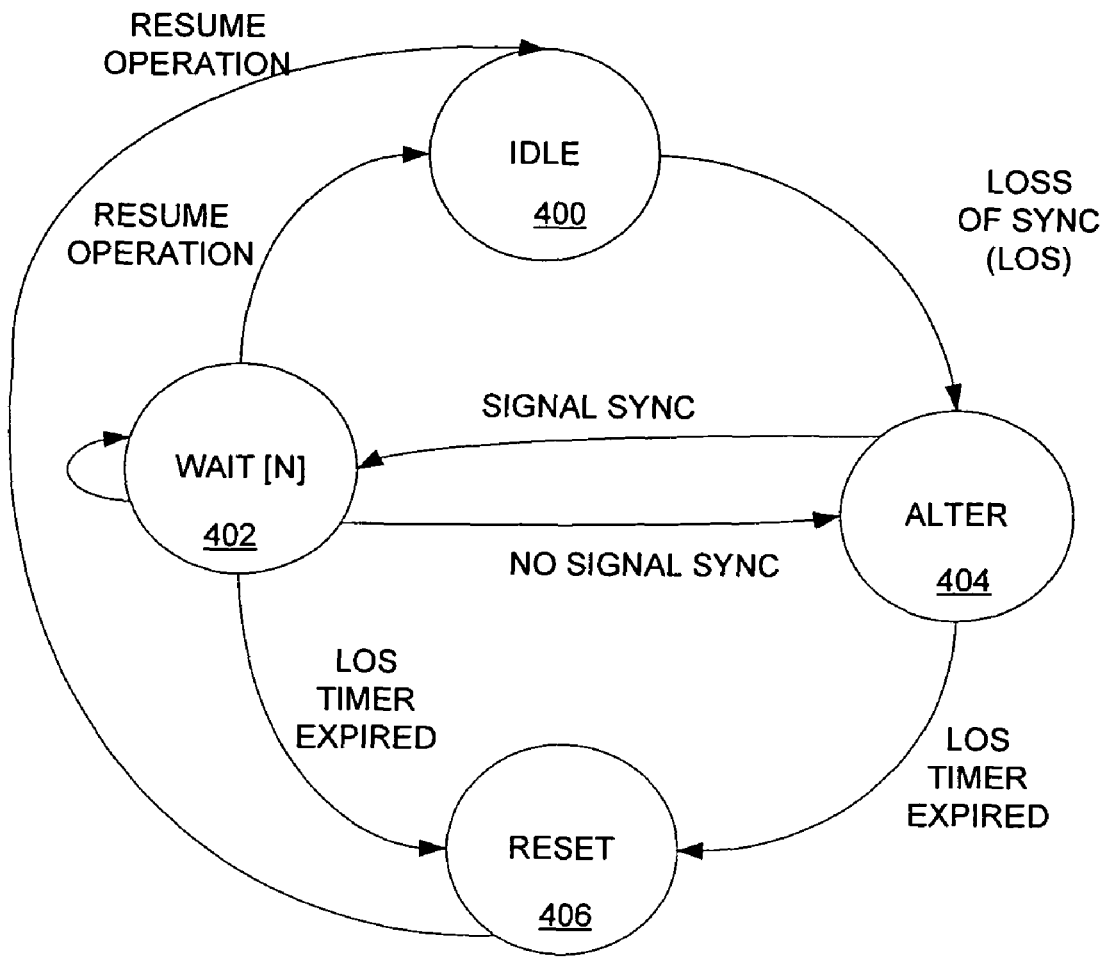
FIG. 4 is a state diagram of the noise filtering state machine shown in FIG. 3.

FIG. 4 is a state diagram of the noise filtering state machine 302 shown in FIG. 3. FIG. 4 will be described in conjunction with FIG. 3. The noise filtering state machine 302 includes four states: idle 400, alter 404, wait 402, and reset 406. The noise filtering state machine 302 waits in idle state 400 until a loss of synchronization is detected.

Upon detecting a loss of synchronization, the noise filtering state machine 302 enters alter state 404. Upon entering the alter state 404, the noise filtering state machine 302 issues an idle state request to the link protocol layer 3 10 to enter idle state 400 and a suspend request to the transport protocol layer 308 to indicate to the transport protocol layer 308 that a potential loss of synchronization has been detected. Upon receiving a suspend request from the noise filtering state machine 302, the transport protocol layer 308 performs a process that will be described later in conjunction with FIG. 7. The LOS timer 304 is started to hold off issuing the COMRESET OOB signal in the event that the "loss of synchronization" is merely due to glitches or noise.

Also, the WSR timer 316 is enabled. The WSR timer expiration time is much shorter than the LOS timer expiration value and allows checking whether the loss of synchronization is an intermittent problem earlier than when only checking based on the LOS timer expiration value. Upon detecting that the LOS timer has expired, the noise filtering state machine 302 transitions to the reset state 406. Upon detecting signal synchronization has been recovered after the expiration of the WSR timer 316, the noise filtering state machine 302 transitions to wait [N] state 402.

Wait[N] state 402 includes N wait states. In each of the N wait states, the WSR timer 306 is started and the signal sync is checked after the WSR timer expires. If no loss of synchronization is detected, the noise filtering state machine remains in Wait[N] state 402 and transitions to the next consecutive wait state. If a loss of synchronization is detected, the noise filtering state machine transitions back to the alter state 404 until no loss of synchronization is detected. If no loss of synchronization is detected after the WSR timer 306 expires in the wait [N] state 402, the noise filtering state machine 302 transitions to the idle state 400 and normal operation is resumed. If the LOS timer 304 expires while in one of the N wait states, the noise filtering state machine 302 transitions to the reset state 406.

In the reset state 406, the OOB sequence of the phy reset sequence is initiated to perform a hard reset of the device. After the OOB sequence is complete, the noise filtering state machine 302 transitions to the idle state 400.

Figure 5:
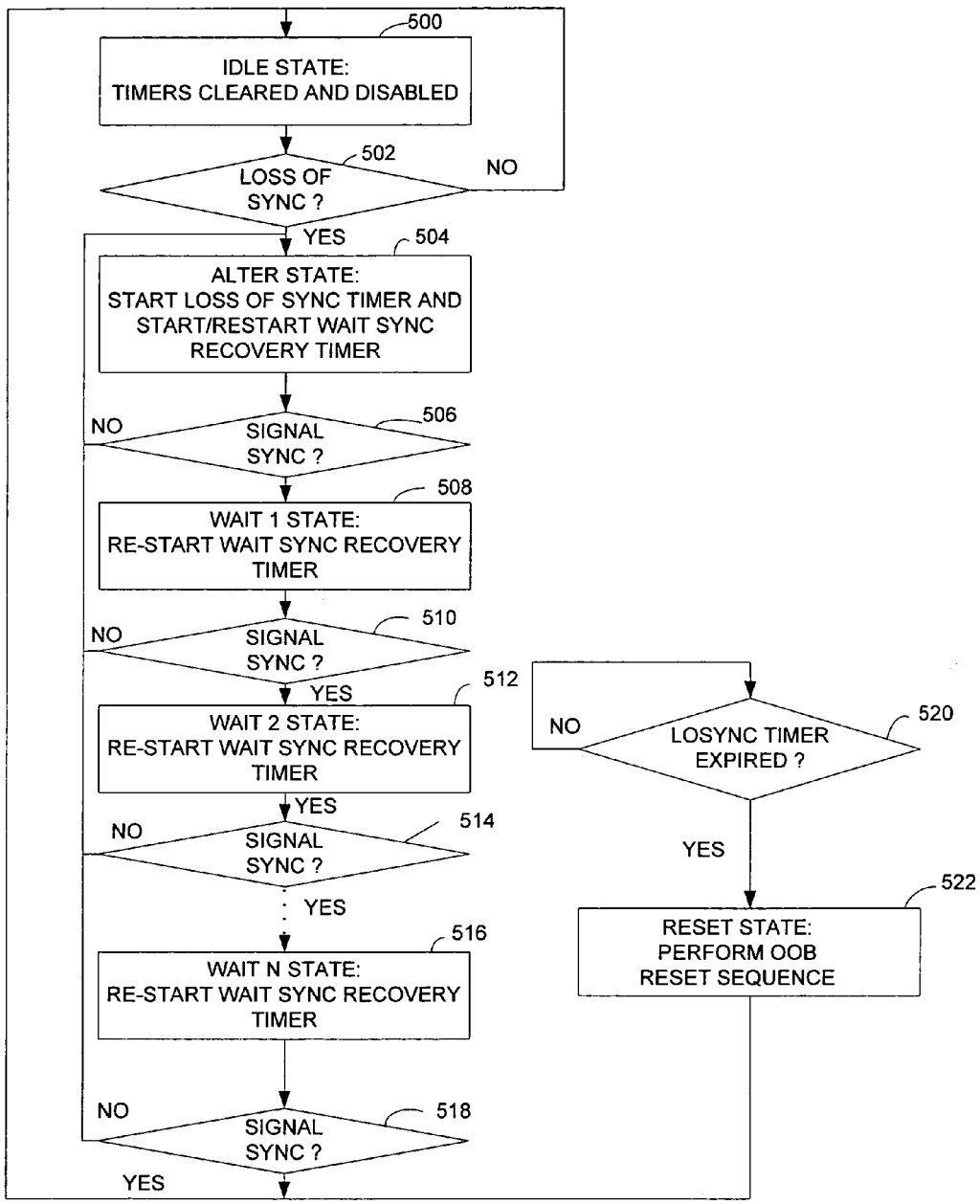
FIG. 5 is a flow diagram of an embodiment of a noise filtering state machine according to the principles of the present invention.

FIG. 5 is a flow diagram of an embodiment of a noise filtering state machine 302 according to the principles of the present invention. FIG. 5 will be described in conjunction with FIGS. 3, 4 and 6.

At block 500, the noise filtering state machine 302 is in an idle state 400 with both the LOS timer 304 and the WSR timer 306 cleared and disabled. The SATA protocol layers 308, 310, 312 shown in FIG. 3 handle the communication over a SATA interface between a SATA device and a host. Processing continues with block 502.

At block 502, if there is a loss of synchronization due to glitches (false or spurious electronic signals), or noise due to device hot-unplug (removal) or device hot-plug, processing continues with block 504. Loss of synchronization is typically detected through the phy layer, for example, through the PHYRDY signal. Also, errors such as running disparity errors, Cyclic Redundancy Check (CRC) errors, 10b-to-8b decode errors and invalid dword errors may indicate a possible loss of synchronization. If a loss of synchronization is not detected, processing continues with block 500.

At block 504, the noise filtering state machine 302 enters alter state 404. In alter state 404, the LOS timer 304 is enabled and started in order to delay starting the phy reset sequence. The issuing the COMRESET OOB signal to start the phy reset sequence is delayed by the LOS timer expiration timer in the event that the "loss of synchronization" is merely due to an intermittent problem having a short duration such as a glitch or noise. The WSR timer 306 is enabled, that is, started or restarted dependent on whether this is the first time entering the alter state 404. The WSR timer 306 is set to an expiration time that is much shorter than the expiration time of the LOS timer 304. For example, in one embodiment the LOS timer 304 is set to a time period that is in the millisecond range and the WSR timer expiration time period is in the 10-100 nanosecond range. After the WSR timer expires, processing continues with block 506.

At block 506, if dword synchronization has been recovered, processing continues with block 508. For example, as shown in FIG. 1, if the loss of synchronization is caused by noise, which may be for a short time period, that is, an out of synchronization period or "bad period", the "bad period" may be followed by a synchronization recovered period or "good period". To ensure that the noise is no longer present, further checks are performed over a plurality of N WSR timer expiration time periods.

Figure 6:
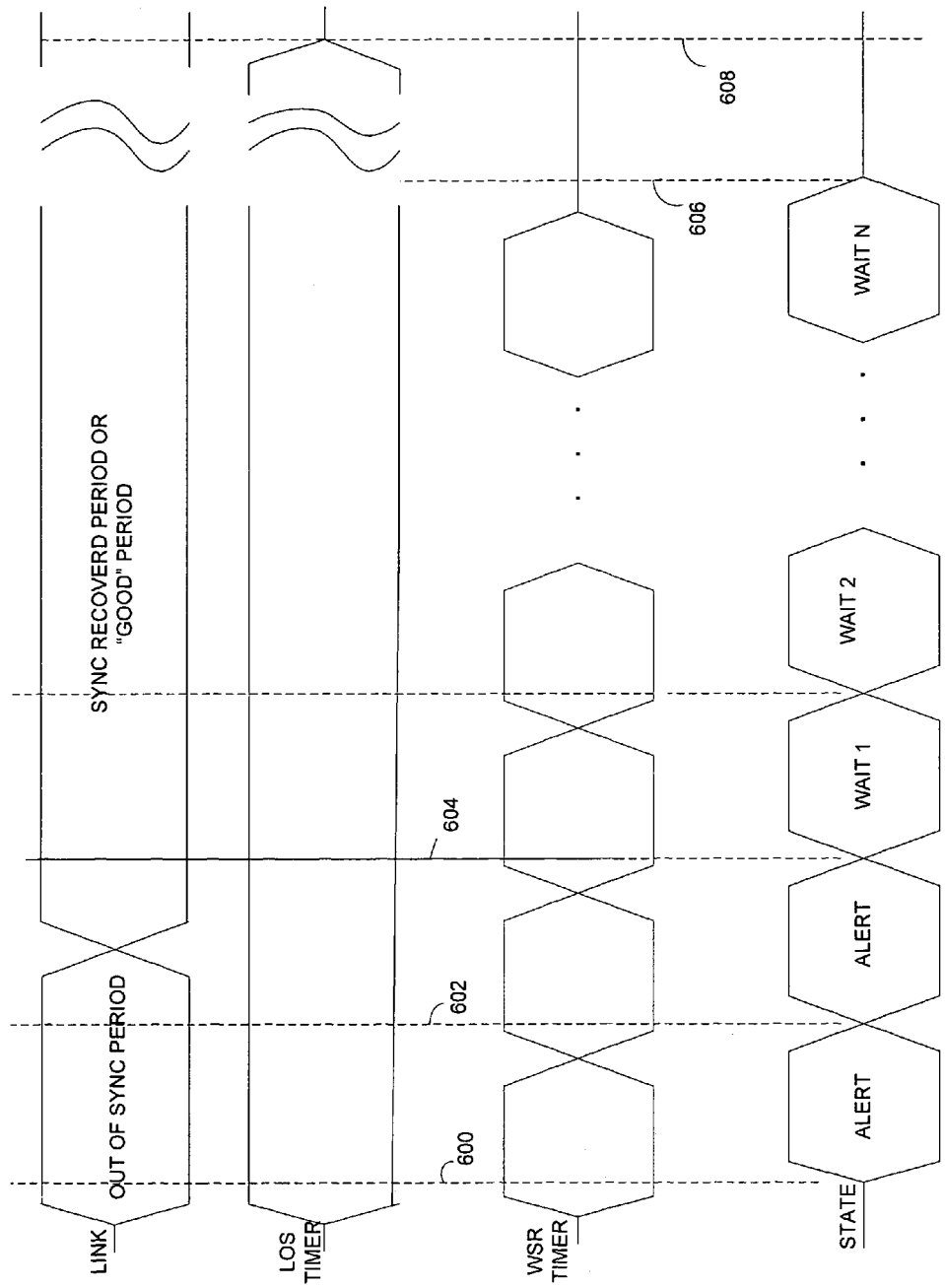
FIG. 6 is a timing diagram illustrating expiration times for the LOS timer and the WRS timer.

FIG. 6 is a timing diagram illustrating expiration times for the LOS timer 304 and the WRS timer 306. Turning to FIG. 6, at time 600, there is a loss of synchronization, the noise filtering state machine 302 enters alter state 404 and the LOS timer 304 and WSR timer 306 are cleared and enabled.

Returning to FIG. 5, at block 506, if dword synchronization has not been recovered or a "bad period" appears during the N WSR timer expiration time periods, processing continues with block 506 to restart the WSR timer 306 to wait for another WSR timer expiration time period prior to rechecking for dword synchronization.

Turning to FIG. 6, when the WSR timer 306 expires at time 602, synchronization has not yet been recovered, so the noise filtering state machine stays in alter state 404 and restarts the WSR timer 306.

Returning to FIG. 5, at block 508, the noise filtering state machine 302 enters wait state 1. Turning to FIG. 6, at time 604, synchronization has been recovered. Returning to FIG. 5, in wait state 1, the noise filtering state machine 302 re-starts the WSR timer 306. Processing continues with block 510.

At block 510, if dword synchronization has been recovered, processing continues with block 512 to enter wait state 2. If synchronization has been lost, processing continues with block 504 with the noise filtering state machine 302 returning to alter state 404 to wait for another WSR timer expiration time period.

At block 512, the noise filtering state machine 302 enters wait state 2. In wait state 2, the noise filtering state machine 302 re-starts the WSR timer. Processing continues with block 514.

At block 514, if dword synchronization has been recovered, processing continues with block 516, to enter the next wait state, in the embodiment shown, the next wait state is wait state N. If synchronization has been lost since the WSR timer 306 last expired, processing continues with block 504 with the noise filtering state machine 302 returning to alter state 404 to wait until the WSR timer 306 expires again.

At block 516, the noise filtering state machine 302 enters wait state N and re-starts the WSR timer 306. Processing continues with block 518.

At block 518, a check is performed to determine if the dword synchronization has been recovered for the recovery period, that is, for N wait states, with each wait state waiting for a WSR timer expiration time period. The number (N) of states to optimize the performance may be dynamically selected based on the type of system in which the device is installed.

For example, typically a server system has a better mechanical design for device hot-plug/removal than a mobile system. In hot-plug/removal applications for the server system, disks may be bolted on a canister or a carrier and be inserted/extracted into/out of storage system backplane which is likely to get less noise than if physical contact is made directly with the connecter when performing hot plugging or removal. In mobile systems, a greater number of wait states may be required because the mobile systems are likely to get more interferences. Therefore in a server system, the number of 'wait' states (value of N) selected may be lower than in a mobile system.

If so, the signal causing the loss of synchronization has been stabilized and dword synchronization has been recovered. In a SATA interface, dword synchronization may be determined by the phy layer from the state of PHYRDY. In a SAS interface, recovery of dword synchronization may be indicated by a Dword Synchronization State Machine (DWS) Reset message. The noise filtering state machine 302 returns to block 500 to idle state 400, clears and disables both the LOS timer 304 and the WSR timer 306; and resumes all SATA protocol layers back to normal operation.

Turning to FIG. 6, at time 606, synchronization is recovered and the transport protocol layer 308, link protocol layer 310 and phy and OOB state machine 312 return to normal operation much earlier than waiting for the LOS timer expiration at time 508. Returning to FIG. 5, if loss of synchronization is detected after N wait states, processing continues with block 504.

At block 520, the noise filtering state machine 302 checks if the LOS timer 304 has expired. If the LOS timer 304 has expired, most likely the loss of synchronization is not temporary due to noise, glitches or device removal and a phy reset sequence may be required to recover synchronization. If the LOS timer 304 has expired, processing continues with block 522 to start the phy reset sequence. If the LOS timer 304 has not expired, processing continues with block 520.

At block 522, there is a non-recoverable loss of synchronization. The noise filtering state machine 302 enters reset state 406 and issues a request to the phy and OOB state machine 312 to start OOB sequencing and issue a COMRESET OOB signal to the device. Upon entering reset state 406, the noise filtering state machine 302 issues a request to the link protocol layer 310 and the transport protocol layer 308 to enter their respective reset states. Processing continues with block 500 to reset (clear) both the LOS timer 304 and the WSR timer 306.

The N wait states in the noise filtering state machine 302 described in conjunction with FIG. 6 is one example of an embodiment for measuring the minimum time period for recovery. In another embodiment, the N wait states may be implemented using counters with a counter being incremented each time the WSR timer 306 expires. The counter continues to be incremented each time the WSR timer expires until the counter reaches an expiration value. While the counter is not at the default count and loss of synchronization is detected again, the counter is reset to the default count.

Figure 7:
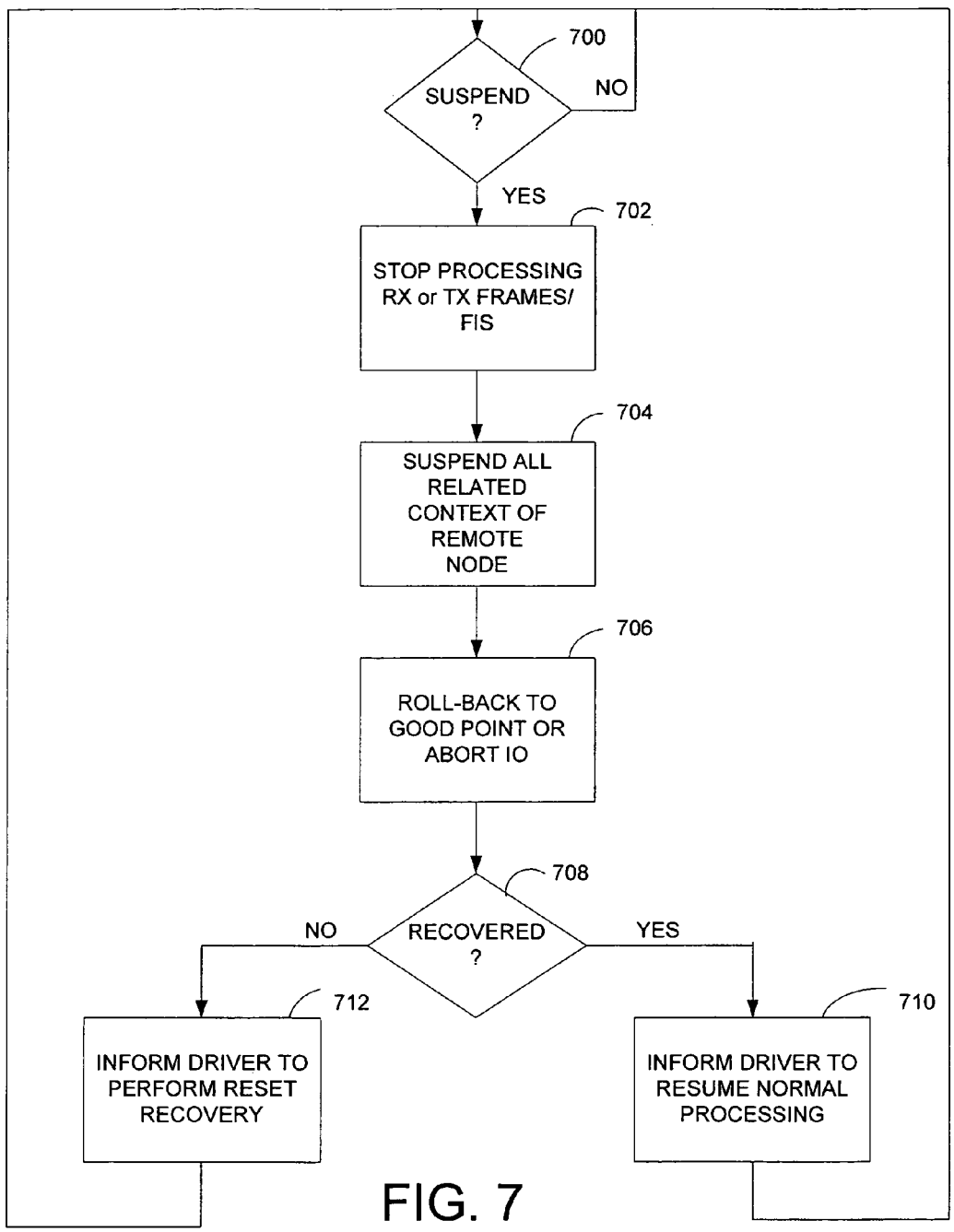
FIG. 7 is a flow graph illustrating an embodiment of a method performed by the transport protocol layer of the SATA protocol to suspend processing of SATA frames and FIS during the loss of synchronization.

FIG. 7 is a flow graph illustrating an embodiment of a method performed by the transport protocol layer 308 of the SATA protocol to suspend processing of SATA frames and FIS during the loss of synchronization.

At block 700, the transport protocol layer 308 waits to receive a suspend request from the noise filtering state machine 302. If a suspend request is received, processing continues with block 702.

At block 702, the transport protocol layer 308 stops processing any received SATA frame/Frame Information Structures (FIS) and stops transmitting any SATA frames/FISes. Processing continues with block 704.

At block 704, the transport protocol layer 308 temporarily suspends all related context and information for the device (remote node). Processing continues with block 706.

At block 706, the transport protocol layer 308 rolls back to a previously recorded "good point" to retry the suspended tasks after the synchronization has been restored by writing back the proper task context such as buffer offset, remaining data transfer count, and status based on the previously remembered 'good' point. If the affected input/output (IO) task (operation) is not retry-able, the transport protocol layer aborts the 10 task. Processing continues with block 708.

At block 708, the transport protocol layer 308 waits for a "loss of synchronization recovered" status from the noise filtering state machine 302. If synchronization has been recovered, processing continues with block 710. If not, processing continues with block 712.

At block 710, the transport protocol layer 308 informs upper layers such as a driver to re-start the aborted 10 tasks, resume the communication with the device (remote node) and continue normal processing.

At block 712, synchronization was not recovered as indicated by the "reset" request received from the noise filtering state machine 302. The transport layer 308 informs upper layers for this event, for example, a device driver, and cleans up the queues and resources of the remote node that will be reset by the phy and OOB state machine.

The noise filtering system allows current communication to be temporarily suspended, informs link and transport protocol layers to take proper actions and informs firmware to retry the corrupted IO tasks. System performance is increased by providing an interface between the noise filtering system and the transport protocol layer and the link protocol layer which reduces the number of interrupts due to temporary loss of synchronization. IO tasks that are not affected by the loss of synchronization may be resumed after synchronization has been restored. As only the corrupted IO tasks, if any, are aborted, other tasks that are not impacted by noise or external interferences continue to be processed by the host system.

The noise filtering system may be used to support hot-swap, that is, both device hot-unplug (hot-removal) and device hot-plug events. Hot swapping or hot-plugging is the ability to remove or replace a device such as a storage device from a host system while the host system is operating. The storage device may be plugged into the host system or unplugged from the host system without the need for a subsequent reboot of the host system. Serial Storage protocols that include hot swapping include Fibre Channel and SATA.

Figure 8:
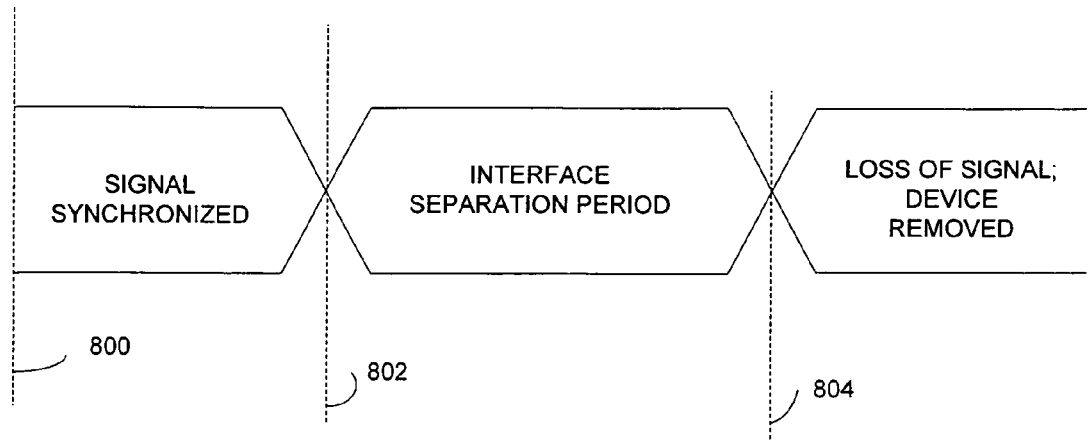
FIG. 8 illustrates the status of the SATA physical interface in the case of a hot removal of a device.

FIG. 8 illustrates the status of the SATA physical interface in the case of a hot removal of a device. At time 800, the SATA interface is synchronized and operates normally. At time 802, the interface separation period begins. During the interface separation period, noise may be introduced and signal sync may alternate between 'on' and 'off. The noise filtering state machine described in conjunction with FIG. 3, prevents a host from issuing a COMRESET OOB signal to the SATA device too early. At time 804, a loss of signal is detected as the device has been removed.

Figure 9:
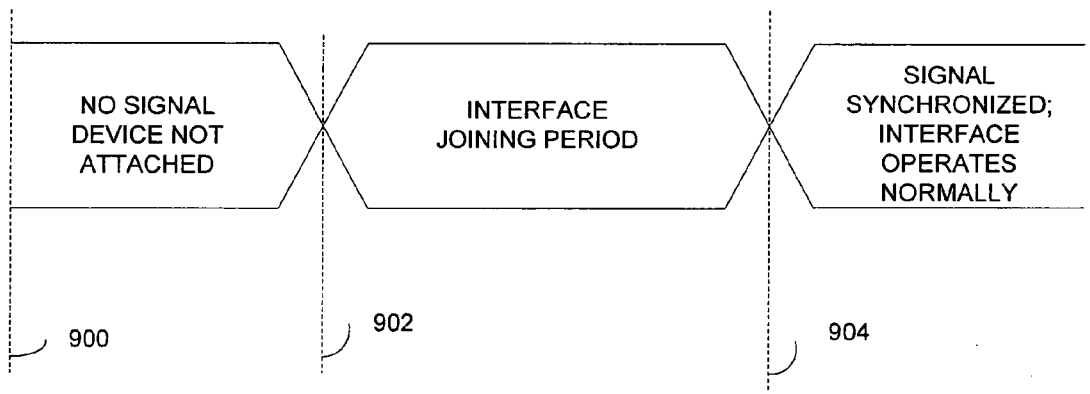
FIG. 9 illustrates the status of the SATA physical interface in the case of a hot plug of a device.

FIG. 9 illustrates the status of the SATA physical interface in the case of a hot plug of a device. At time 900, there is no signal received on the SATA interface because a device is not attached to a host system. At time 902, the interface joining period begins. During the interface joining period, noise may be introduced and signal synchronization may alternate between synchronized and not synchronized. The noise filtering state machine 302 prevents interrupts during the interface joining period. At time 904, the signal is synchronized as indicated by the PHYRDY signal, that is, there is DWORD synchronization and the SATA interface operates normally.

Glitches or noise may be generated during a hot-plug or hot-removal operation. For example, the SATA Built in Self Test (BIST) mode may be used to test a SATA device. The SATA BIST mode requires that a SATA device remain in SATA BIST mode until loss of power or receipt of a COMRESET. However, while the SATA device is in SATA BIST mode, the SATA device may be unplugged from the system and test equipment may be plugged into the system to perform necessary measurement of the device. During the device removal process, glitches may be generated when touching the SATA connector. Typically host bus adaptors may detect the noise as loss of synchronization and issue a COMRESET. Unfortunately, the SATA device may receive the COMRESET prior to the completion of device removal resulting in the device exiting the SATA BIST mode making it difficult to test the SATA device.

In a device hot removal event in a SATA system, the noise filtering system may prevent a SATA host or a SATA device from issuing a SATA OOB signal such as COMRESET too early. In a device hot plug event, the dynamically adjusted waiting period due to noise in the hot-plugging process provides less false synchronization detections and therefore results in less firmware interrupts during hot-plug events.

An embodiment has been described for a noise filtering system for a single SATA link between a SATA host bus adaptor and a SATA device. A host bus adapter may be connected to a plurality of SATA devices and standard cable/connector assemblies are available for connecting multiple SATA links from the host bus adapter to individual SATA devices. Each of the SATA links is typically referred to as a lane.

Figure 10:
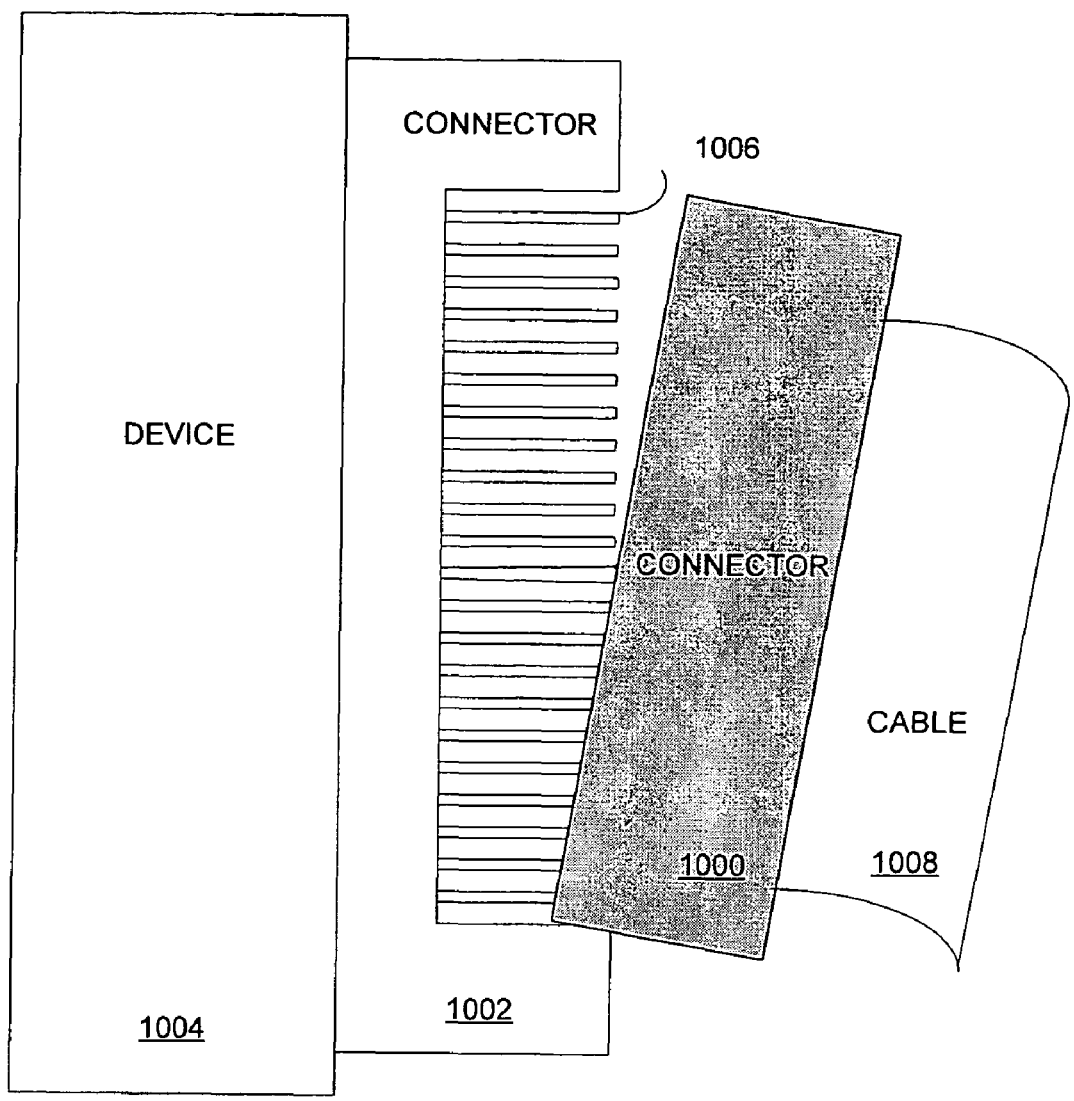
FIG. 10 illustrates insertion/extraction of a multi-lane SATA connector into a device in which some of the pins on the connector are inserted/removed prior to other pins on the connector.

FIG. 10 illustrates insertion/extraction of a multi-lane SATA connector 1000 into a device in which some of the pins on the connector are inserted/removed prior to other pins on the connector. As shown in FIG. 6, the multi-lane SATA connector 1000 coupled to a cable 1006 may not be inserted or extracted at a 90 degree angle into the connector 1002 on the device 1004. Thus, some pins 1008 on connector 1002 may have established contact with multi-lane SATA connector 1000 and other pins 1008 may not have established contact. This may result in noise on a portion of the SATA lanes and no noise on the other SATA lanes.

Figure 11:
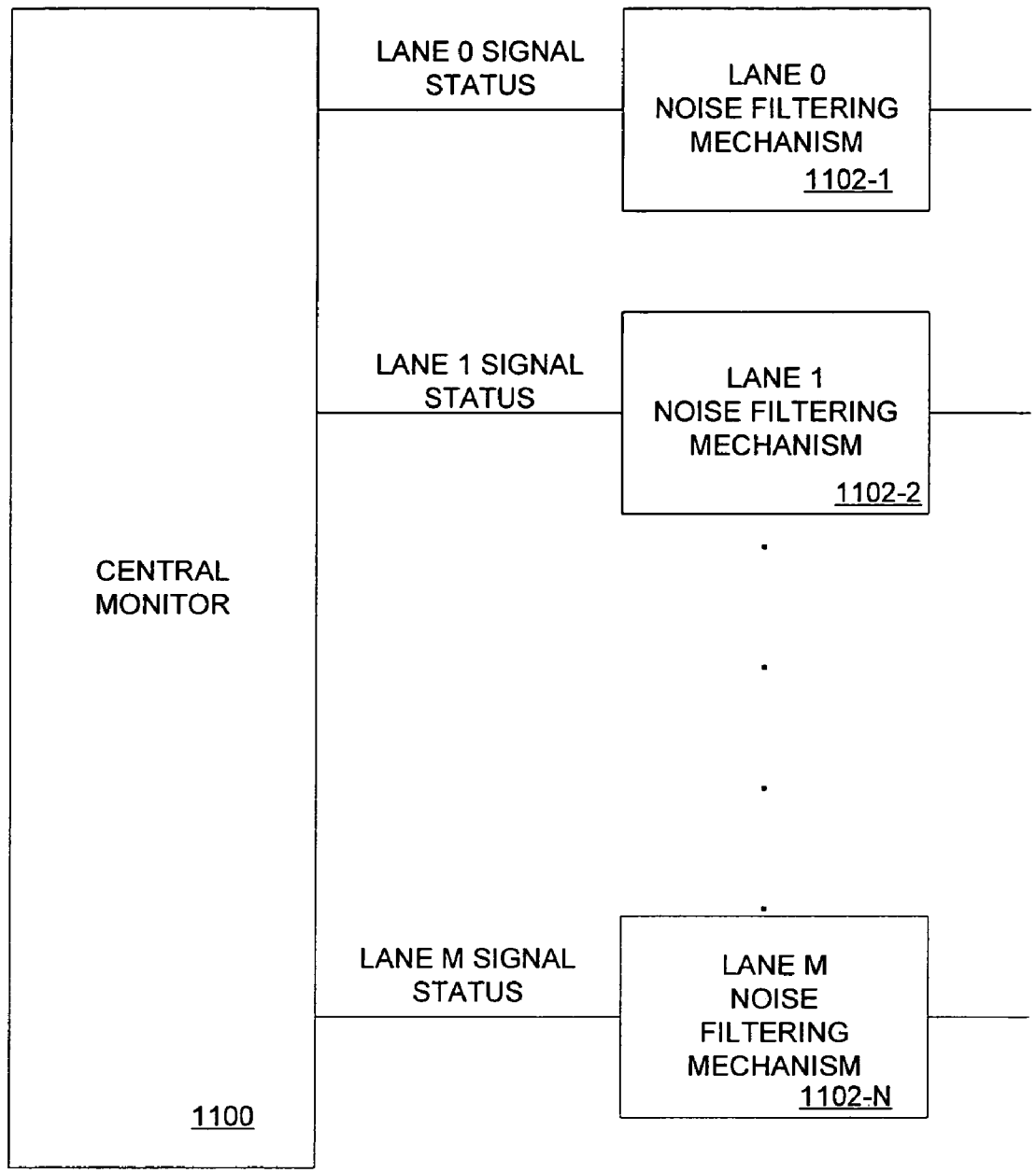
FIG. 11 is a block diagram of a system that includes a central monitor for monitoring status of multiple SATA lanes.

FIG. 11 is a block diagram of a system that includes a central monitor for monitoring status of multiple SATA lanes. As shown in FIG. 11, a noise filtering system is provided for monitoring noise and glitches on the respective lane as described in conjunction with FIG. 3.

A central monitor 1100 monitors signal status from a plurality of noise filtering systems 1102-1, 1102-2, . . . , 1102-N, with each noise filtering system associated with a respective SATA device. The central monitor 1100 determines when all lanes either have "signal detected" in the case of a hot plug event or "signal lost" in the case of a hot removal event.

Upon detecting a hot plug event or a hot removal event, the central monitor 1100 performs the appropriate processing for the detected event. For example, the central monitor 1100 may inform firmware that the connection to a device has been inserted and stabilized or that the connection to the device has been removed by extracting the respective connection. Through the use of the central monitor 1100, hot-plug/hot removal may also be supported in multi-pin/port configurations such as SAS wide port, and Parallel ATA interface.

Most host devices define a device specific fixed waiting time upon loss of synchronization prior to issuing an OOB signal to perform a hard reset of a device. The noise filtering system significantly reduces the lengthy noise recovery time by reducing this fixed waiting time. The potential time savings can be from millisecond to second range dependent on the selected noise interruption period.

Although the invention has been described for an embodiment using the SATA protocol. The invention is not limited to the SATA protocol. An embodiment of the invention may be used similar applications where hot-plug/hot-removal is used and/or where there is a noisy filtering requirement.

For example, the invention may be used for SAS, Fibre Channel (FC), parallel ATA, and parallel Small Computer System Interface (SCSI) or similar protocols. A version of the Fibre Channel (FC) protocol is described in the American National Standards Institute (ANSI) Standard Fibre Channel Physical and Signaling Interface-2 (FC-FS-2) Aug. 9, 2005 Specification.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
   a noise filtering system to wait a dynamically adjustable recovery time to check for no loss of signal synchronization prior to resuming communication on a communication link after detection of a potential loss of signal synchronization on the communications link resulting in communication on the communications link for an established connection being suspended, the connection established after completion of a phy reset sequence,
   wherein the noise filtering system comprises:
   a synchronization recovery timer having an expiration time shorter than a loss of synchronization expiration time, the dynamically adjustable recovery time capable of being adjusted based on selecting a number of times that the synchronization recovery timer expires, and
   a noise filtering state machine coupled to the synchronization recovery timer for managing the dynamically adjustable recovery time, the noise filtering state machine to issue an idle state request to a link protocol layer and a suspend request to a transport protocol layer to indicate that the potential loss of signal synchronization has been detected.

2. The apparatus of claim 1, wherein the dynamically adjustable recovery time is shorter than a loss of synchronization expiration time, the dynamically adjustable recovery time used to determine whether to initiate the phy reset sequence.

3. The apparatus of claim 1, wherein the communication over the communications link is performed using the Serial Advanced Technology Attachment (SATA) protocol, a PHYRDY signal in a phy layer to indicate loss of signal synchronization.

4. The apparatus of claim 1, wherein the communication over the communications link is performed using the Serial Attached Small Computer System Interface (SAS) protocol, a DWORD synchronization state machine lost message to indicate loss of signal synchronization.

5. The apparatus of claim 1, wherein the communication over the communications link is performed using the Fibre Channel protocol.

6. The apparatus of claim 1, further comprising:
   a monitor coupled to the noise filtering system for monitoring signal synchronization for a plurality of noise filtering systems, each of the plurality of noise filtering systems for detecting signal synchronization after a loss of signal synchronization on one of a plurality of communications links.

7. The apparatus of claim 1, wherein the noise filtering state machine provides an indication of loss of synchronization to the link protocol layer and the transport protocol layer managing communication for the established connection on the communication link.

8. A method comprising:
   detecting a potential loss of signal synchronization on a communications link resulting in communication on the communications link for an established connection being suspended, the connection established after completion of a phy reset sequence; and
   waiting a dynamically adjustable recovery time to check for no loss of signal synchronization prior to resuming communication on the communication link,
   wherein the dynamically adjustable recovery time is capable of being adjusted based on selecting a number of times that a synchronization recovery timer expires, the synchronization recovery timer having an expiration time shorter than a loss of synchronization expiration time, the dynamically adjustable recovery time used to determine whether to initiate the phy reset sequence,
   wherein the dynamically adjustable recovery time is managed by a noise filtering state machine coupled to the synchronization recovery timer, the noise filtering state machine to issue an idle state request to a link protocol layer and a suspend request to a transport protocol layer to indicate that the potential loss of signal synchronization has been detected.

9. The method of claim 8, wherein the dynamically adjustable recovery time is shorter than a loss of synchronization expiration time, the dynamically adjustable recovery time used to determine whether to initiate the phy reset sequence.

10. The method of claim 8, wherein the communication over the communications link is performed using the Serial Advanced Technology Attachment (SATA) Protocol, a PHYRDY signal in a phy layer to indicate loss of signal synchronization.

11. The method of claim 8, wherein the communication over the communications link is performed using the Serial Attached Small Computer System Interface (SAS) protocol, a DWORD synchronization state machine lost message to indicate loss of signal synchronization.

12. The method of claim 8, wherein the communication over the communications link is performed using the Fibre Channel protocol.

13. The method of claim 8, further comprising:
monitoring signal synchronization on a plurality of communication links, for a plurality of noise filtering systems, each of the plurality of noise filtering systems for detecting signal synchronization after a loss of signal synchronization on one of a plurality of communications links.

14. The method of claim 8, further comprising:
providing an indication of loss of synchronization to the link protocol layer and the transport protocol layer managing communication for the established connection on the communication link.

15. An article including a machine-accessible storage medium having information stored therein, wherein the information, when accessed, results in a machine performing:
detecting a potential loss of signal synchronization on a communications link resulting in communication on the communications link for an established connection being suspended, the connection established after completion of a phy reset sequence; and
waiting a dynamically adjustable recovery time to check for no loss of signal synchronization prior to resuming communication on the communication link,
wherein the dynamically adjustable recovery time is capable of being adjusted based on selecting a number of times that a synchronization recovery timer expires, the synchronization recovery timer having an expiration time shorter than a loss of synchronization expiration time, the dynamically adjustable recovery time used to determine whether to initiate the phy reset sequence,
wherein the dynamically adjustable recovery time is managed by a noise filtering state machine coupled to the synchronization recovery timer, the noise filtering state machine to issue an idle state request to a link protocol layer and a suspend request to a transport protocol layer to indicate that the potential loss of signal synchronization has been detected,
wherein the machine further performing:
monitoring signal synchronization on a plurality of communication links, for a plurality of noise filtering systems, each of the plurality of noise filtering systems for detecting signal synchronization after a loss of signal synchronization on one of a plurality of communications links, the noise filtering systems to issue an idle state request to a link protocol layer and a suspend request to a transport protocol layer to indicate that the potential loss of signal Synchronization has been detected.

16. The article of claim 15, wherein the dynamically adjustable recovery time is shorter than a loss of synchronization expiration time, the dynamically adjustable recovery time used to determine whether to initiate the phy reset sequence.

17. A system comprising:
a disk drive; and
a host bus adaptor, the host bus adaptor comprising:
a noise filtering system to wait a dynamically adjustable recovery time to check for no loss of signal synchronization prior to resuming communication on the communication link after detection of a potential loss of signal synchronization on a communications link resulting in communication on the communications link for an established connection being suspended, the connection established after completion of a phy reset sequence,
wherein the noise filtering system further comprises:
a synchronization recovery timer having an expiration time shorter than a loss of synchronization expiration time, the dynamically adjustable recovery time capable of being adjusted based on selecting a number of times that the synchronization recovery timer expires,
wherein the noise filtering system further comprises:
a noise filtering state machine coupled to the synchronization recovery timer for managing the dynamically adjustable recovery time, the noise filtering state machine to issue an idle state request to a link protocol layer and a suspend request to a transport protocol layer to indicate that the potential loss of signal synchronization has been detected.

\* \* \* \* \*